United States Patent
Matsubara

[11] 3,925,910
[45] Dec. 16, 1975

[54] OBJECTIVE LENS SYSTEMS FOR USE IN MICROSCOPES

[75] Inventor: Masaki Matsubara, Hachioji, Japan

[73] Assignee: Olympus Optical Company Limited, Tokyo, Japan

[22] Filed: May 1, 1974

[21] Appl. No.: 466,044

Related U.S. Application Data

[63] Continuation-in-part of Ser. No. 277,040, Aug. 1, 1972, abandoned.

[52] U.S. Cl. .................................. 350/218; 350/177
[51] Int. Cl.² ...................... G02B 9/60; G02B 1/00
[58] Field of Search .................... 350/177, 215, 218

[56] References Cited
FOREIGN PATENTS OR APPLICATIONS
1,213,140   3/1966   Germany .......................... 350/218

*Primary Examiner*—Paul A. Sacher
*Attorney, Agent, or Firm*—Waters, Schwartz & Nissen

[57] ABSTRACT

Objective lens systems for use in microscopes, constructed as five components and eight lenses of the Gauss type, consisting of a first component of a single positive lens, a second component of a compound positive lens, third and fourth components of compound negative lenses, and a fifth component of a single positive lens, all lenses arranged in succession from the side of the object, defined by specific conditions that are disclosed herein.

6 Claims, 10 Drawing Figures

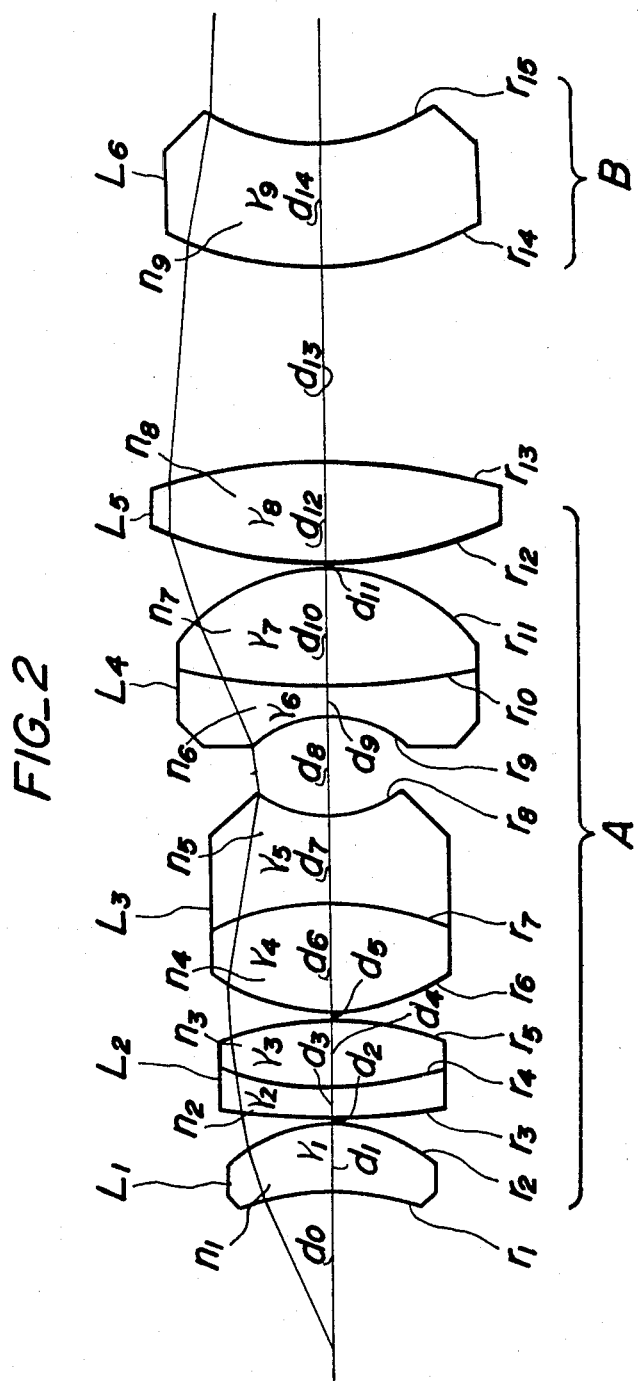
FIG_2

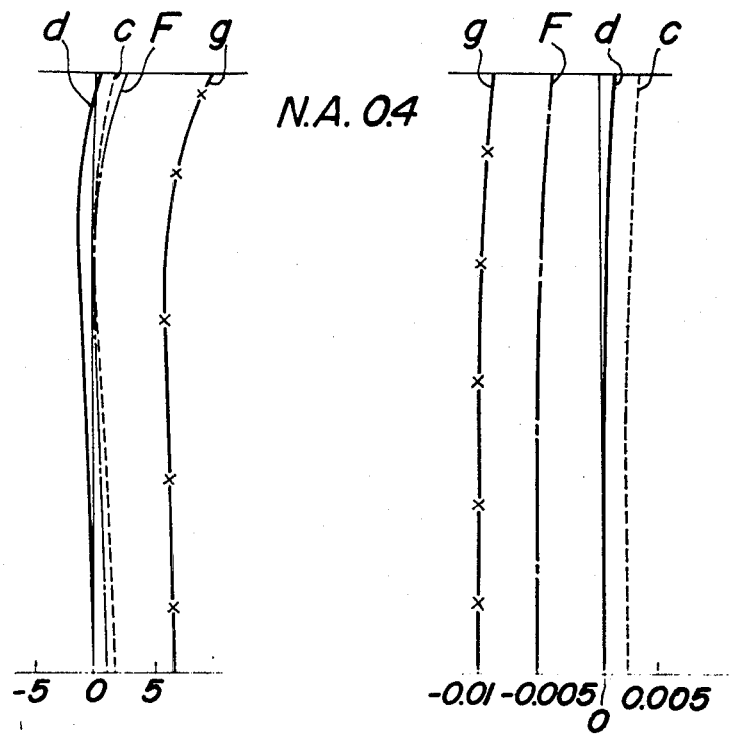

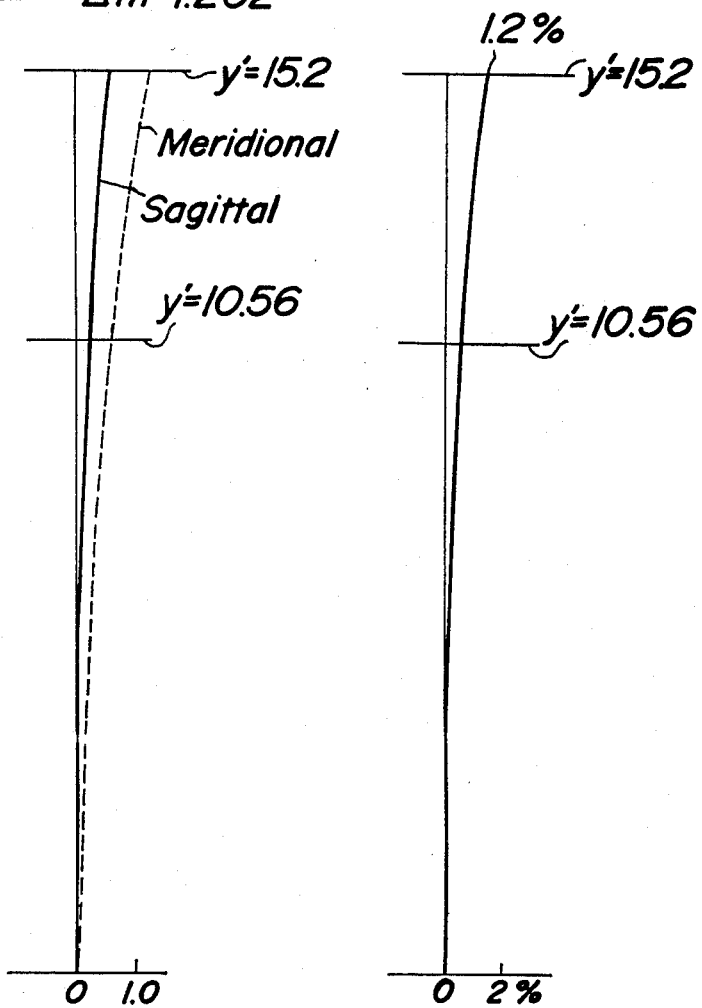

FIG_4A
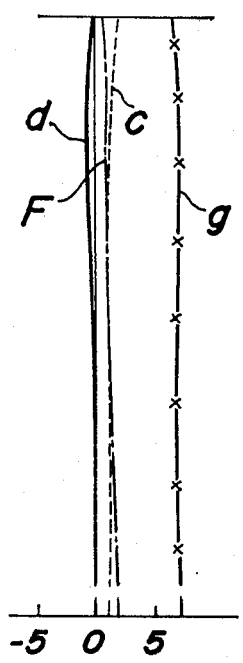
FIG_4B
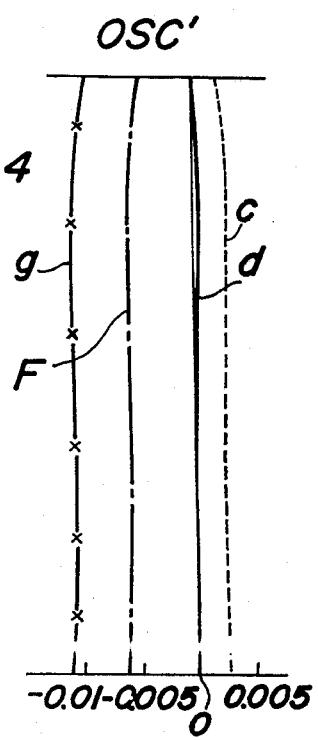
N.A. 0.4

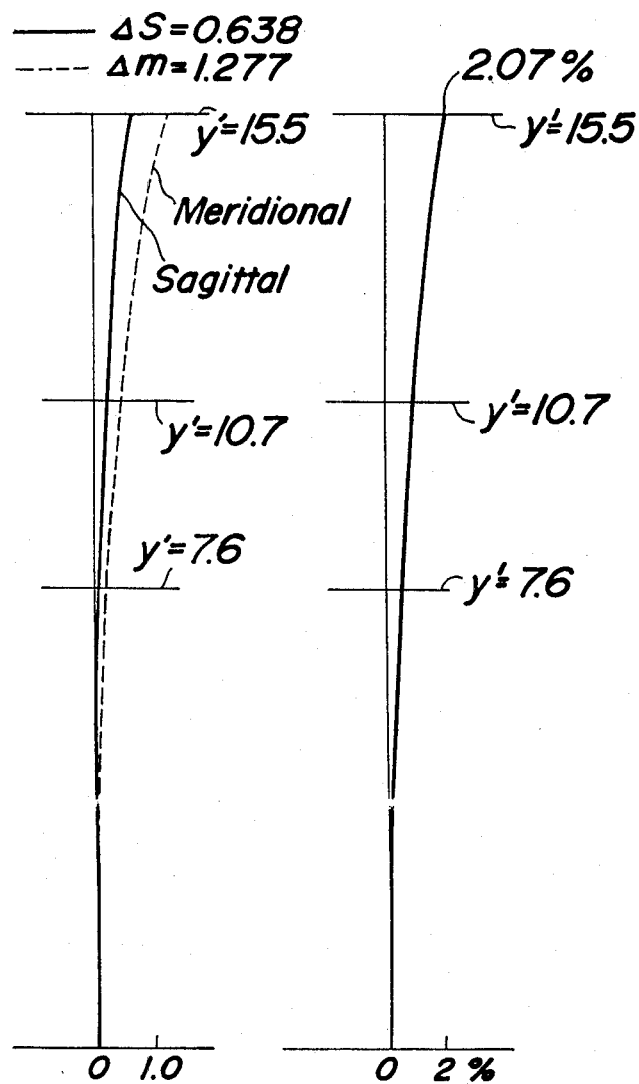

OBJECTIVE LENS SYSTEMS FOR USE IN MICROSCOPES

This is a Continuation-in-part application of Ser. No. 277,040 filed Aug. 1, 1972, titled "Objective Lens Systems For Use In Microscopes" of the same inventor, now abandoned.

This invention relates to objective lens systems having a magnification in the order of 20 X, a flat image surface and a long work distance, and adapted for use in microscopes.

An objective lens system, having a flat image surface in which a meniscus lens that has as its object side an excessively concaved surface is arranged in a first component of lenses, and an objective lens system in which a meniscus lens having an excessively concaved surface is arranged in a rear component of lenses, have heretofore been well known. Such conventional lens systems have the disadvantage that the first-mentioned system tends to have a shortened work distance, and the second-mentioned system tends to have increased chromatic aberrations.

In refractive-type objective lens systems used in general, in order to make their work distance long, it is necessary to divide the total lens system into at least two components of positive and negative lens systems and arrange the positive system at the object side and the negative system at the image side. However, the negative lens system arranged at the image side makes the focal length of the positive lens system located at the object side considerably longer and, as a result, the chromatic aberrations of the spherical aberration become excessive in proportion to the increase of the focal length of the positive lens system located at the object side.

In designing an objective lens system for use in microscopes having a long work distance, the most difficult problem consists of how to correct chromatic aberrations.

In order to correct such aberrations, it is necessary to select the kind of lens materials, the arrangement of the sucessive lenses and the refractive power of lenses such that the chromatic aberrations can significantly be corrected irrespective of the long work distance.

In order to decrease the chromatic aberrations, the dispersion of light rays must be made small at the object side of the lens system. The arrangement of a lens having a large axial thickness near an object, from which are emitted light rays along ray paths inclined from the optical axis by large angles, is contrary to the design necessary for making the work distance long and, as a result, a compound lens must not be arranged near the object.

The object of the invention, therefore, by adopting suitable dimensions for successive components of lenses and a suitable combination and arrangement thereof, is to provide a novel objective lens system for use in microscopes that obviates the above-mentioned disadvantages of the conventional objective lens systems.

For a better understanding of the invention, the same will be explained by reference to the accompanying drawings, wherein:

FIG. 2 shows in cross-section another lens system according to the invention; and FIGS. 3A to 3D and 4A to 4D show various aberration characteristic curves of the objective lens systems shown in FIGS. 1 and 2, respectively.

Figure 1:
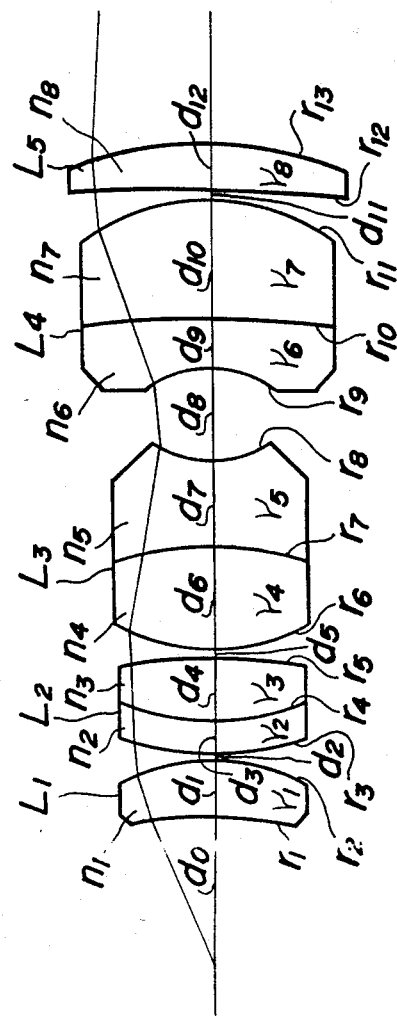
FIG. 1 shows in cross-section a first objective lens system according to the invention.

In FIG. 1 is shown one objective lens system according to the invention, which is constructed in five components with eight lenses of the Gauss type. $L_1$ designates a first component consisting of a single positive lens, $L_2$ is a second component of a compound positive lens, $L_3$ and $L_4$ are third and fourth components of compound negative lenses, respectively, and $L_5$ is a fifth component consisting of a single positive lens, all of these lenses being arranged in succession from the side of an object.

As seen from FIG. 1, the compound lenses $L_2$, $L_3$ and $L_4$ are located relatively far from the object and are made of lens materials whose Abbe's numbers are large so as to correct chromatic aberrations. Moreover, the single positive lens $L_1$ is made of a material having a comparatively large refractive power and small dispersive power, and is located near the object so as to avoid color dispersion.

In the present embodiment, the lens system is constructed as a Gauss type which permits the correction of curvature of the image surface and chromatic aberrations to be effected by the concaved portions arranged in opposition to each other.

The objective lens system according to the present embodiment is designed such that the following six conditions are satisfied:

I $0.8f < f_1$,
II $0.7f < |r_1| < 1.5f$, $r_1 < 0$,
III $d_1 < 0.3f$,
IV $0.30f < r_8 < 0.45f$,
V $0.25f < |r_9| < 0.40f$, $r_9 < 0$,
VI $\nu_3, \nu_7 > 65$ where
$f$ is the focal length of the total lens system;
$f_1$ is the focal length of the first component of the single positive lens $L_1$;
$r_1$, $r_8$, $r_9$ are radii of curvatures of the front concave surface of the first component of the single positive lens $L_1$, rear and front concave surfaces of the third and fourth components of compound negative lenses $L_3$ and $L_4$, respectively;
$d_1$ is the axial thickness of the first component of the single positive lens $L_1$; and
$\nu_3$, $\nu_7$ are Abbe's numbers of the positive lenses of the second and fourth components of compound negative lenses $L_2$, $L_4$, respectively.

The conditions I, II and III must be satisfied in order to make the work distance as large as possible. In the first component of single positive lens $L_1$, if the condition $0.8f > f_1$ is satisfied, it is possible to prevent the refractive power of the lens $L_1$ from becoming large. Moreover, if the condition $0.7f < |r_1|$ is satisfied, the free work distance does not become short. If the condition $|r_1| < 1.5f$ is satisfied, it is possible to put the various aberrations in balance. If the condition $d_1 < 0.3f$ is satisfied, the work distance can be increased.

The conditions IV and V relate to the curvature of the image surface. If $r_8$ and $|r_9|$ exceed the upper limits, the Petzval sum becomes larger to degrade the flatness of the image surface and make the correction of the aberrations impossible. On the other hand, if $r_8$ and $|r_9|$ become less than the lower limits, it is impossible to make the Petzval sum small, but the coma is increased to make the various aberrations unbalanced.

The condition VI relates to the chromatic aberrations. The convex lenses of the second and fourth components of compound negative lenses $L_2$ and $L_4$ must be made of materials whose Abbe's numbers are larger than 65 for the purpose of significantly correcting the chromatic aberrations.

In FIG. 2 is shown another objective lens system according to the invention, which comprises two components of lens systems, i.e., a positive lens system A located at the object side and a negative lens system B located at the image side.

The positive lens system A is constructed in five components with eight lenses of the Gauss type and consists of a first component of a single positive lens $L_1$, a second component of a compound positive lens $L_2$, third and fourth components of compound negative lenses $L_3$ and $L_4$, and a fifth component of a single positive lens $L_5$, all of these lenses being arranged in succession from the side of the object as in the previous embodiment shown in FIG. 1.

The negative lens system B located at the image side consists of a single or compound negative meniscus lens $L_6$.

In this embodiment, the positive lens system A located at the object side is constructed as a Gauss type as in the previous embodiment shown in FIG. 1 to correct the curvature of the image surface and chromatic aberrations by the concaved positions arranged in opposition to each other. Moreover, the provision of the negative lens system B located at the image side renders it possible to signigicantly correct the curvature of the image surface by its concave surface.

The objective lens system according to the present embodiment is designed such that the following conditions are satisfied:

a. the six conditions I through VI as stated earlier for the exemplary objective lens system according to FIG. 1; however, with an additional condition to be fulfilled in VI in respect of $\nu_8$; and b. VII $1.2f < f_p < 1.8f$ where $f, f_1, r_1, r_8, r_9, d_1, \nu_3$ and $\nu_7$ have the same definitions as those described with reference to the previous embodiment shown in FIG. 1;

$f_p$ is the composite focal length of the positive lens system A located at the object side; and $\nu_8$ is the Abbe's number of the fifth component of the single positive lens $L_5$ of the lens system A.

In the present embodiment, the condition VII limits the refractive power of the positive lens system A located at the object side. If practice, $f_p$ should be larger than $1.2f$ in order to obtain a desired work distance and should be smaller than $1.8f$ in order to correct the chromatic aberrations.

The reasons why the conditions I to VI should be satisfied are substantially the same as those described with reference to previous embodiment shown in FIG. 1. In the embodiment of FIG. 2, it is also necessary to satisfy the condition (within VI) $\nu_8 > 65$ so as to sufficiently correct the chromatic aberrations. Thus, it is preferable to make the fifth component of the single positive lens $L_5$ with a lens material whose Abbe's number is larger than 65. It is preferable to use the lens $L_5$ made of a lens material whose dispersion is small so as to sufficiently correct the chromatic aberrations by the positive lens system A.

The invention will now be described with reference to examples.

EXAMPLE 1

The lens system is constructed and arranged as shown in FIG. 1 and has the following values.

N.A. = 0.4, Magnification = 20 X, $f = 11.51, f_1 = 11.108$

|  |  |  |  |  |
|---|---|---|---|---|
|  |  | $d_0 = 5.0$ |  |  |
| $L_1$ | $r_1 = -16.437$ | $d_1 = 1.93$ | $n_1 = 1.788$ | $\nu_1 = 47.5$ |
|  | $r_2 = -6.007$ |  |  |  |
|  |  | $d_2 = 0.11$ |  |  |
|  | $r_3 = 15.0$ | $d_3 = 1.09$ | $n_2 = 1.6398$ | $\nu_2 = 34.6$ |
| $L_2$ | $r_4 = 7.304$ | $d_4 = 2.14$ | $n_3 = 1.48656$ | $\nu_3 = 84.5$ |
|  | $r_5 = -14.127$ |  |  |  |
|  |  | $d_5 = 0.28$ |  |  |
|  | $r_6 = 6.923$ | $d_6 = 3.44$ | $n_4 = 1.618$ | $\nu_4 = 63.4$ |
| $L_3$ | $r_7 = -11.03$ | $d_7 = 3.03$ | $n_5 = 1.62588$ | $\nu_5 = 35.7$ |
|  | $r_8 = 3.982$ |  |  |  |
|  |  | $d_8 = 3.02$ |  |  |
|  | $r_9 = -3.127$ | $d_9 = 1.62$ | $n_6 = 1.64769$ | $\nu_6 = 33.8$ |
| $L_4$ | $r_{10} = -63.654$ | $d_{10} = 4.2$ | $n_7 = 1.48656$ | $\nu_7 = 84.5$ |
|  | $r_{11} = -6.629$ |  |  |  |
|  |  | $d_{11} = 0.16$ |  |  |
|  | $r_{12} = -88.716$ | $d_{12} = 1.7$ | $n_8 = 1.6968$ | $\nu_8 = 56.5$ |
| $L_5$ | $r_{13} = -11.782$ |  |  |  |

EXAMPLE 2

The lens system is constructed and arranged as shown in FIG. 2 and has the following values.

N.A. = 0.4, Magnification = 20 X, $f = 10.26, f_p = 15.87, f_1 = 18.73$

|  |  |  |  |  |  |
|---|---|---|---|---|---|
|  |  |  | $d_0 = 5.3$ |  |  |
|  | $L_1$ | $r_1 = -8.33$ | $d_1 = 2.21$ | $n_1 = 1.56384$ | $\nu_1 = 60.81$ |
|  |  | $r_2 = -5.10$ |  |  |  |
|  |  |  | $d_2 = 0.15$ |  |  |
|  |  | $r_3 = 26.22$ | $d_3 = 1.02$ | $n_2 = 1.54869$ | $\nu_2 = 45.55$ |
|  | $L_2$ | $r_4 = 12.17$ | $d_4 = 2.33$ | $n_3 = 1.48656$ | $\nu_3 = 84.47$ |
|  |  | $r_5 = -11.28$ |  |  |  |
|  |  |  | $d_5 = 0.37$ |  |  |
| A |  | $r_6 = 7.85$ | $d_6 = 3.46$ | $n_4 = 1.618$ | $\nu_4 = 63.38$ |
|  | $L_3$ | $r_7 = -9.58$ | $d_7 = 3.07$ | $n_5 = 1.6393$ | $\nu_5 = 44.88$ |
|  |  | $r_8 = 4.29$ |  |  |  |
|  |  |  | $d_8 = 3.2$ |  |  |
|  |  | $r_9 = -3.71$ | $d_9 = 0.99$ | $n_6 = 1.57309$ | $\nu_6 = 42.57$ |
|  | $L_4$ | $r_{10} = 23.38$ | $d_{10} = 4.05$ | $n_7 = 1.48656$ | $\nu_7 = 84.47$ |
|  |  | $r_{11} = -6.11$ |  |  |  |
|  |  |  | $d_{11} = 0.25$ |  |  |
|  | $L_5$ | $r_{12} = 16.96$ | $d_{12} = 3.30$ | $n_8 = 1.48656$ | $\nu_8 = 84.47$ |
|  |  | $r_{13} = -18.95$ |  |  |  |
|  |  |  | $d_{13} = 7.00$ |  |  |

3,925,910

-continued

N.A. = 0.4, Magnification = 20 X,
f = 10.26, $f_\nu$ = 15.87, $f_1$ = 18.73

B-L$_6$ { $r_{14}$= 10.15
         $r_{15}$= 7.1 }   $d_{14}$=4.27   $n_9$=1.58144   $\nu_9$=40.75

The Seidel's coefficients at the object surface when $f$ is 1 mm and the image point is located at a point which is infinitely distant from the lens system are given by Brek's expressions in the following Table.

The Examples 3 and 4 that follow show the parameters of the lens construction shown in FIG. 1 while the Examples 5 and 6 show the parameters of the construction shown in FIG. 2.

Table

| Number of Lens Surfaces | A$_\nu$ | B$_\nu$ | T$_\nu$ | P$_\nu$ | □$_\nu$ |
|---|---|---|---|---|---|
| 1 | 0.0387 | 0.0628 | −0.0493 | −0.4439 | 0.4852 |
| 2 | −0.0156 | −0.4642 | −0.0851 | 0.7246 | 1.4208 |
| 3 | 0.1889 | 0.4119 | 0.279 | 0.1386 | 0.8128 |
| 4 | −0.0398 | −0.167 | −0.0816 | −0.0227 | −0.3885 |
| 5 | 0.0163 | 0.4495 | 0.0856 | 0.2976 | 3.924 |
| 6 | 0.3292 | 0.8854 | 0.5399 | 0.4993 | 2.2707 |
| 7 | −0.0182 | −0.1975 | −0.06 | −0.0086 | −0.6782 |
| 8 | −1.1822 | −1.0999 | −1.1403 | −0.9321 | −1.9599 |
| 9 | −0.3519 | −1.4804 | −0.7218 | −1.0084 | −5.1047 |
| 10 | −0.3374 | −0.0778 | −0.1621 | −0.0162 | −0.0452 |
| 11 | 0.3792 | 0.6697 | 0.5039 | 0.5499 | 1.6206 |
| 12 | 1.1276 | 0.0395 | 0.2111 | 0.198 | 0.0445 |
| 13 | 0.1999 | 0.4916 | 0.3135 | 0.1772 | 1.0487 |
| 14 | 0.321 | 0.0874 | −0.1675 | 0.3714 | −0.2393 |
| 15 | −0.7010 | −0.3359 | 0.4852 | −0.5311 | 0.6002 |
| Σ | −0.0452 | −0.725 | −0.0493 | −0.0066 | 3.8116 |

As seen from the above Table, the total sum Σ of each of the five Seidel's coefficients is substantially zero except □$_\nu$. This shows that the embodiment shown in FIG. 2 makes it possible to sufficiently correct the aberrations.

Various aberration characteristic curves of the embodiment of FIG. 1 are shown in FIGS. 3A to 3D. FIG. 3A shows the spherical aberrations, FIG. 3B the OSC', FIG. 3C the astigmatisms, and FIG. 3D the distortion.

As seen from these aberration characteristic curves, the objective lens system according to the embodiment of FIG. 1 renders it possible to significantly correct various aberrations as shown in FIGS. 3A to 3D and make the image surface flat as shown in FIG. 3D irrespective of the long work distance of $d_0$=5.0 mm.

Various aberration characteristic curves of the embodiment of FIG. 2 are shown in FIGS. 4A to 4D, FIG. 4A shows the spherical aberrations, FIG. 4B the OSC', FIG. 4C the astigmatisms, and FIG. 4D the distortion.

As seen from these aberration characteristic curves, the objective lens system according to the embodiment curves, the objective lens system according to the embodiment of FIG. 2 renders it possible to significantly correct various aberrations as shown in FIGS. 4A to 4D and make the image surface flat as shown in FIG. 4D irrespective of the long work distance of $d_0$=5.3 mm.

In the following, additional explanatory Examples are given in which $f_1$ and $d_1$ are near the upper and lower limits of the earlier described conditions I and III, as well as the conditions II and IV, considered to be most important for the objective lens systems in accordance with the present invention.

EXAMPLE 3

| | | | | | | |
|---|---|---|---|---|---|---|
| | | $d_0$ | 5.69 | | | |
| $r_1$ | −16.500 | $d_1$ | 1.18 | $n_1$ | 1.78800 | $\nu_1$ | 47.49 |
| $r_2$ | −6.002 | $d_2$ | 0.09 | | | |
| $r_3$ | 14.928 | $d_3$ | 1.09 | $n_2$ | 1.63980 | $\nu_2$ | 34.58 |
| $r_4$ | 7.314 | $d_4$ | 2.13 | $n_3$ | 1.48656 | $\nu_3$ | 84.47 |
| $r_5$ | −14.117 | $d_5$ | 0.28 | | | |
| $r_6$ | 6.909 | $d_6$ | 3.50 | $n_4$ | 1.61800 | $\nu_4$ | 63.38 |
| $r_7$ | −11.031 | $d_7$ | 3.09 | $n_5$ | 1.62588 | $\nu_5$ | 35.70 |
| $r_8$ | 3.982 | $d_8$ | 3.02 | | | |
| $r_9$ | −3.128 | $d_9$ | 1.60 | $n_6$ | 1.64769 | $\nu_6$ | 33.80 |
| $r_{10}$ | −63.588 | $d_{10}$ | 4.18 | $n_7$ | 1.48656 | $\nu_7$ | 84.47 |
| $r_{11}$ | −6.634 | $d_{11}$ | 0.16 | | | |
| $r_{12}$ | −86.071 | $d_{12}$ | 1.70 | $n_8$ | 1.69680 | $\nu_8$ | 55.52 |
| $r_{13}$ | −11.808 | | | | | |
| | f=11.365 | $f_1$=11.406 | (1.00f) | | | |

EXAMPLE 4

| | | | | | | |
|---|---|---|---|---|---|---|
| | | $d_0$ | 3.66 | | | |
| $r_1$ | −16.409 | $d_1$ | 3.39 | $n_1$ | 1.78800 | $\nu_1$ | 47.49 |
| $r_2$ | −5.999 | $d_2$ | 0.17 | | | |
| $r_3$ | 15.093 | $d_3$ | 1.12 | $n_2$ | 1.63980 | $\nu_2$ | 34.58 |
| $r_4$ | 7.295 | $d_4$ | 2.18 | $n_3$ | 1.48656 | $\nu_3$ | 84.47 |

-continued

| | | | | | | |
|---|---|---|---|---|---|---|
| $r_5$ | −14.120 | | | | | |
| | | $d_5$ | 0.31 | | | |
| $r_6$ | 6.960 | | | | | |
| | | $d_6$ | 3.36 | $n_4$ | 1.61800 | $\nu_4$ 63.38 |
| $r_7$ | −11.029 | | | | | |
| | | $d_7$ | 2.95 | $n_5$ | 1.62588 | $\nu_5$ 35.70 |
| $r_8$ | 3.976 | | | | | |
| | | $d_8$ | 3.06 | | | |
| $r_9$ | −3.127 | | | | | |
| | | $d_9$ | 1.66 | $n_6$ | 1.64769 | $\nu_6$ 33.80 |
| $r_{10}$ | −64.695 | | | | | |
| | | $d_{10}$ | 4.22 | $n_7$ | 1.48656 | $\nu_7$ 84.47 |
| $r_{11}$ | −6.607 | | | | | |
| | | $d_{11}$ | 0.12 | | | |
| $r_{12}$ | −90.673 | | | | | |
| | | $d_{12}$ | 1.68 | $n_8$ | 1.69680 | $\nu_8$ 55.52 |
| $r_{13}$ | −11.827 | | | | | |
| | $f=11.327$ | | $f_1=10.421$ | | $(0.92f)$ | |

The numerical values of $f_1$ and $d_1$ given by the Examples 1 and 2 and those given by the additional Examples 3 to 6 are compared with each in the following table.

| | EXAMPLES | | | | | |
|---|---|---|---|---|---|---|
| | 1 | 2 | 3 | 4 | 5 | 6 |
| $f_1$ | 0.965f | 1.826f | 1.004f | 0.920f | 1.876f | 1.785f |
| $d_1$ | 0.168f | 0.215f | 0.104f | 0.299f | 0.101f | 0.2999f |

The Examples 1 and 2 relate to microscope objectives used in practice, and the parameters therein are optimum values within the ranges as considered to be critical for the invention. An extremely large number of calculations have been carried out to obtain these optimum numerical values. As a result, the ranges defined by the conditions I to VI and I to VII, as claimed herein, are those recognized by the inventor in the course of obtaining the above optimum numerical values. If persons skilled in the art make use of the numerical values within the above ranges, defined by the claimed conditions, various aberrations can be corrected to such an extent that the resulting objective can be reliably used in practice.

The closest prior art is the German Pat. No. 1,213,140 to Leitz, published on Mar. 24, 1966, over which the present invention constitutes substantial improvements, as can be seen from the comparison given in the following Table.

Table

| | Leitz Patent | Present Invention |
|---|---|---|
| Lens construction | Telesystem having a large air space $a_4$ (FIG. 1) or $a_2$ (FIG. 2) | Gauss type lens |
| *Magnification | 4× (claim 8) 8× (claim 9) | 20× Large |
| *Working Distance | Small Short | Long |
| Image Surface Curvature | $\Sigma P=-0.0263$ (first embodiment) $\Sigma P=-0.0318$ (second embodiment) Large | $\Sigma P_\nu =-0.0066$ (Table on page 10) Small |
| N.A. | 0.14–0.18 | 0.4 |
| Field Number | Small Unknown | Large 30 |
| Means for obtaining N.A.=0.4 | Small Constructions shown in FIGS. 1 and 2 must be modified so as to add several front lenses: At a result, Working | Large No modification |

Table-continued

| | Leitz Patent | Present Invention |
|---|---|---|
| | Distance becomes short | |

*A feature of the invention is the provision of a microscope objective which can make its magnification large without shortening the working distance. The magnification 4× or 8× disclosed in the Leitz Patent is not satisfactory for use in microscopes.

It will be understood by those skilled in the art that modifications are possible within the spirit and scope of the present invention as defined herein.

What I claim is:

1. An objective lens system for use in microscopes, constructed as five components and eight lenses of the Gauss type, consisting of a first component of a single positive lens, a second component of a compound positive lens, third and fourth components of compound negative lenses, and a fifth component of a single positive lens, all lenses arranged in succession from the side of the object, wherein N.A. = 0.4, Magnification = 20 X, $f= 11.51$, $f_1 = 11.108$ and $r_1$ to $r_{13}$, $d_0$ to $d_{12}$, $n_1$ to $n_8$ and $\nu_1$ to $\nu_8$ are defined by the following values:

| | | | |
|---|---|---|---|
| $r_1 =-16.437$ | $d_0 =5.0$ | | |
| $r_2 = -6.007$ | $d_1 =1.93$ | $n_1=1.788$ | $\nu_1=47.5$ |
| $r_3 = 15.0$ | $d_2 =0.11$ | | |
| $r_4 = 7.304$ | $d_3 =1.09$ | $n_2=1.6398$ | $\nu_2=34.6$ |
| $r_5 =-14.127$ | $d_4 =2.14$ | $n_3=1.48656$ | $\nu_3=84.5$ |
| $r_6 = 6.923$ | $d_5 =0.28$ | | |
| $r_7 =-11.03$ | $d_6 =3.44$ | $n_4=1.618$ | $\nu_4=63.4$ |
| $r_8 = 3.982$ | $d_7 =3.03$ | $n_5=1.62588$ | $\nu_5=35.7$ |
| $r_9 = -3.127$ | $d_8 =3.02$ | | |
| $r_{10}=-63.654$ | $d_9 =1.62$ | $n_6=1.64769$ | $\nu_6=33.8$ |
| $r_{11}= -6.629$ | $d_{10}=4.2$ | $n_7=1.48656$ | $\nu_7=84.5$ |
| $r_{12}=-88.716$ | $d_{11}=0.16$ | | |
| $r_{13}=-11.782$ | $d_{12}=1.7$ | $n_8=1.6968$ | $\nu_8=56.5$ | where $f$ is the focal length of the total lens system;

$f_1$ is the focal length of the first component of the single positive lens;

$r_1$, $r_8$, $r_9$ are radii of curvatures of the front concave surface of the first component of the single positive lens, rear and front concave surfaces of the third and fourth components of compound negative lenses, respectively;

$d_1$ is the axial thickness of the first component of the single positive lens; and $\nu_3$, $\nu_7$ are Abbe's numbers of the positive lenses of the second and fourth components of compound negative lenses, respectively.

2. An objective lens system for use in microscopes, constructed as five components and eight lenses of the Gauss type, consisting of a first component of a single positive lens, a second component of a compound positive lens, third and fourth components of compound negative lenses, and a fifth component of a single positive lens, all lenses arranged in succession from the side of the object, wherein N.A. = 0.4, Magnification = 20 X, $f = 11.365$, $f_1 = 11.406$ (1.00$f$), and $r_1$ to $r_{13}$, $d_0$ to $d_{12}$, $n_1$ to $n_8$ and $\nu_1$ to $\nu_8$ are defined by the following values:

| | | $d_0$ | 5.69 | | | | |
|---|---|---|---|---|---|---|---|
| $r_1$ | −16.500 | | | | | | |
| | | $d_1$ | 1.18 | $n_1$ | 1.78800 | $\nu_1$ | 47.49 |
| $r_2$ | −6.002 | | | | | | |
| | | $d_2$ | 0.09 | | | | |
| $r_3$ | 14.928 | | | | | | |
| | | $d_3$ | 1.09 | $n_2$ | 1.63980 | $\nu_2$ | 34.58 |
| $r_4$ | 7.314 | | | | | | |
| | | $d_4$ | 2.13 | $n_3$ | 1.48656 | $\nu_3$ | 84.47 |
| $r_5$ | −14.117 | | | | | | |
| | | $d_5$ | 0.28 | | | | |
| $r_6$ | 6.909 | | | | | | |
| | | $d_6$ | 3.50 | $n_4$ | 1.61800 | $\nu_4$ | 63.38 |
| $r_7$ | −11.031 | | | | | | |
| | | $d_7$ | 3.09 | $n_5$ | 1.62588 | $\nu_5$ | 35.70 |
| $r_8$ | 3.982 | | | | | | |
| | | $d_8$ | 3.02 | | | | |
| $r_9$ | −3.128 | | | | | | |
| | | $d_9$ | 1.60 | $n_6$ | 1.64769 | $\nu_6$ | 33.80 |
| $r_{10}$ | −63.588 | | | | | | |
| | | $d_{10}$ | 4.18 | $n_7$ | 1.48656 | $\nu_7$ | 84.47 |
| $r_{11}$ | −6.634 | | | | | | |
| | | $d_{11}$ | 0.16 | | | | |
| $r_{12}$ | −86.071 | | | | | | |
| | | $d_{12}$ | 1.70 | $n_8$ | 1.69680 | $\nu_8$ | 55.52 |
| $r_{13}$ | −11.808 | | | | | | | where $f$ is the focal length of the total lens system;

$f_1$ is the focal length of the first component of the single positive lens;

$r_1$, $r_8$, $r_9$ are radii of curvatures of the front concave surface of the first component of the single positive lens, rear and front concave surfaces of the third and fourth components of compound negative lenses, respectively;

$d_1$ is the axial thickness of the first component of the single positive lens; and $\nu_3$, $\nu_7$ are Abbe's numbers of the positive lenses of the second and fourth components of compound negative lenses, respectively.

3. An objective lens system for use in microscopes, constructed as five components and eight lenses of the Gauss type, consisting of a first component of a single positive lens, a second component of a compound positive lens, third and fourth components of compound negative lenses, and a fifth component of a single positive lens, all lenses arranged in succession from the side of the object, wherein N.A. = 0.4, Magnification = 20 X, $f = 11.327$, $f_1 = 10.421$ (0.92$f$), and $r_1$ to $r_{13}$, $d_0$ to $d_{12}$, $n_1$ to $n_8$ and $\nu_1$ to $\nu_8$ are defined by the following values:

| | | $d_0$ | 3.66 | | | | |
|---|---|---|---|---|---|---|---|
| $r_1$ | −16.409 | | | | | | |
| | | $d_1$ | 3.39 | $n_1$ | 1.78800 | $\nu_1$ | 47.49 |
| $r_2$ | −5.999 | | | | | | |
| | | $d_2$ | 0.17 | | | | |
| $r_3$ | 15.093 | | | | | | |
| | | $d_3$ | 1.12 | $n_2$ | 1.63980 | $\nu_2$ | 34.58 |
| $r_4$ | 7.295 | | | | | | |
| | | $d_4$ | 2.18 | $n_3$ | 1.48656 | $\nu_3$ | 84.47 |
| $r_5$ | −14.120 | | | | | | |
| | | $d_5$ | 0.31 | | | | |
| $r_6$ | 6.960 | | | | | | |
| | | $d_6$ | 3.36 | $n_4$ | 1.61800 | $\nu_4$ | 63.38 |
| $r_7$ | −11.029 | | | | | | |
| | | $d_7$ | 2.95 | $n_5$ | 1.62588 | $\nu_5$ | 35.70 |
| $r_8$ | 3.976 | | | | | | |
| | | $d_8$ | 3.06 | | | | |
| $r_9$ | −3.127 | | | | | | |
| | | $d_9$ | 1.66 | $n_6$ | 1.64769 | $\nu_6$ | 33.80 |
| $r_{10}$ | −64.695 | | | | | | |
| | | $d_{10}$ | 4.22 | $n_7$ | 1.48656 | $\nu_7$ | 84.47 |
| $r_{11}$ | −6.607 | | | | | | |
| | | $d_{11}$ | 0.12 | | | | |
| $r_{12}$ | −90.673 | | | | | | |
| | | $d_{12}$ | 1.68 | $n_8$ | 1.69680 | $\nu_8$ | 55.52 |
| $r_{13}$ | −11.827 | | | | | | | where $f$ is the focal length of the total lens system;

$f_1$ is the focal length of the first component of the single positive lens;

$r_1$, $r_8$, $r_9$ are radii of curvatures of the front concave surface of the first component of the single positive lens, rear and front concave surfaces of the third and fourth components of compound negative lenses, respectively;

$d_1$ is the axial thickness of the first component of the single positive lens; and $\nu_3$, $\nu_7$ are Abbe's numbers of the positive lenses of the second and fourth components of compound negative lenses, respectively.

4. An objective lens system for use in microscopes, constructed as five components and eight lenses of the Gauss type, consisting of a first component of a single positive lens, a second component of a compound positive lens, third and fourth components of compound negative lenses, and a fifth component of a single positive lens, all lenses arranged in succession from the side of the object, further comprising a negative lens system located at the image side and consisting of a single or compound negative meniscus lens, wherein N.A. = 0.4, Magnification = 20 X, $f = 10.26$, $f_p = 15.87$, $f_1 = 18.73$, and $r_1$ to $r_{15}$, $d_0$ to $d_{14}$, $n_1$ to $n_9$ and $\nu_1$ to $\nu_9$ are defined by the following values:

| | $d_0$ = 5.3 | | |
|---|---|---|---|
| $r_1$ = −8.33 | | | |
| | $d_1$ = 2.21 | $n_1$=1.56384 | $\nu_1$=60.81 |
| $r_2$ = −5.10 | | | |
| | $d_2$ = 0.15 | | |
| $r_3$ = 26.22 | | | |
| | $d_3$ = 1.02 | $n_2$=1.54869 | $\nu_2$=45.55 |
| $r_4$ = 12.17 | | | |
| | $d_4$ = 2.33 | $n_3$=1.48656 | $\nu_3$=84.47 |
| $r_5$ = −11.28 | | | |
| | $d_5$ = 0.37 | | |
| $r_6$ = 7.85 | | | |
| | $d_6$ = 3.46 | $n_4$=1.618 | $\nu_4$=63.38 |
| $r_7$ = −9.58 | | | |
| | $d_7$ = 3.07 | $n_5$=1.6393 | $\nu_5$=44.88 |
| $r_8$ = 4.29 | | | |
| | $d_8$ = 3.2 | | |
| $r_9$ = −3.71 | | | |
| | $d_9$ = 0.99 | $n_6$=1.57309 | $\nu_6$=42.57 |
| $r_{10}$ = 23.38 | | | |
| | $d_{10}$ = 4.05 | $n_7$=1.48656 | $\nu_7$=84.47 |
| $r_{11}$ = −6.11 | | | |
| | $d_{11}$ = 0.25 | | |
| $r_{12}$ = 16.96 | | | |
| | $d_{12}$ = 3.30 | $n_8$=1.48656 | $\nu_8$=84.47 |
| $r_{13}$ = −18.95 | | | |
| | $d_{13}$ = 7.00 | | |
| $r_{14}$ = 10.15 | | | |
| | $d_{14}$ = 4.27 | $n_9$=1.58144 | $\nu_9$=40.75 |
| $r_{15}$ = 7.1 | | | | where $f$ is the focal length of the total lens system;

$f_1$ is the focal length of the first component of the single positive lens;

$r_1$, $r_8$, $r_9$ are radii of curvatures of the front concave surface of the first component of the single positive lens, rear and front concave surfaces of the third and fourth components of compound negative lenses, respectively;

$d_1$ is the axial thickness of the first component of the single positive lens;

$\nu_3, \nu_7$ are Abbe's numbers of the positive lenses of the second and fourth components of compound negative lenses, respectively;

$f_p$ is the composite focal length of the positive lens system located at the object side; and $\nu_8$ is the Abbe's number of the fifth component of the single positive lens of said lens system located at the object side.

5. An objective lens system for use in microscopes, constructed as five components and eight lenses of the Gauss type, consisting of a first component of a single positive lens, a second component of a compound positive lens, third and fourth components of compound negative lenses, and a fifth component of a single positive lens, all lenses arranged in succession from the side of the object, further comprising a negative lens system located at the image side and consisting of a single or compound negative meniscus lens, wherein N.A. = 0.4, Magnification = 20 X, $f$ = 11.03, $f_1$ = 20.69 (1.88f), and $r_1$ to $r_{15}$, $d_0$ to $d_{14}$, $n_1$ to $n_9$ and $\nu_1$ to $\nu_9$ are defined by the following values:

|  |  |  |  |  |  |  |
|---|---|---|---|---|---|---|
|  |  | $d_0$ | 6.55 |  |  |  |
| $r_1$ | −8.338 |  |  |  |  |  |
|  |  | $d_1$ | 1.11 | $n_1$ | 1.56384 | $\nu_1$ | 60.81 |
| $r_2$ | −5.096 |  |  |  |  |  |
|  |  | $d_2$ | 0.15 |  |  |  |
| $r_3$ | 26.160 |  |  |  |  |  |
|  |  | $d_3$ | 1.02 | $n_2$ | 1.54869 | $\nu_2$ | 45.55 |
| $r_4$ | 12.177 |  |  |  |  |  |
|  |  | $d_4$ | 2.33 | $n_3$ | 1.48656 | $\nu_3$ | 84.47 |
| $r_5$ | −11.260 |  |  |  |  |  |
|  |  | $d_5$ | 0.37 |  |  |  |
| $r_6$ | 7.845 |  |  |  |  |  |
|  |  | $d_6$ | 3.47 | $n_4$ | 1.61800 | $\nu_4$ | 63.38 |
| $r_7$ | −9.583 |  |  |  |  |  |
|  |  | $d_7$ | 3.08 | $n_5$ | 1.63930 | $\nu_5$ | 44.88 |
| $r_8$ | 4.290 |  |  |  |  |  |
|  |  | $d_8$ | 3.20 |  |  |  |
| $r_9$ | −3.706 |  |  |  |  |  |
|  |  | $d_9$ | 1.01 | $n_6$ | 1.57309 | $\nu_6$ | 42.57 |
| $r_{10}$ | 23.373 |  |  |  |  |  |
|  |  | $d_{10}$ | 4.08 | $n_7$ | 1.48656 | $\nu_7$ | 84.47 |
| $r_{11}$ | −6.110 |  |  |  |  |  |
|  |  | $d_{11}$ | 0.24 |  |  |  |
| $r_{12}$ | 16.938 |  |  |  |  |  |
|  |  | $d_{12}$ | 3.29 | $n_8$ | 1.48656 | $\nu_8$ | 84.47 |
| $r_{13}$ | −19.138 |  |  |  |  |  |
|  |  | $d_{13}$ | 6.99 |  |  |  |
| $r_{14}$ | 10.123 |  |  |  |  |  |
|  |  | $d_{14}$ | 4.28 | $n_9$ | 1.58144 | $\nu_9$ | 40.75 |
| $r_{15}$ | 7.102 |  |  |  |  |  | where $f$ is the focal length of the total lens system;

$f_1$ is the focal length of the first component of the single positive lens;

$r_1, r_8, r_9$ are radii of curvatures of the front concave surface of the first component of the single positive lens, rear and front concave surfaces of the third and fourth components of compound negative lenses, respectively;

$d_1$ is the axial thickness of the first component of the single positive lens;

$\nu_3, \nu_7$ are Abbe's numbers of the positive lenses of the second and fourth components of compound negative lenses, respectively;

$f_p$ is the composite focal length of the positive lens system located at the object side; and $\nu_8$ is the Abbe's number of the fifth component of the single positive lens of said lens system located at the object side.

6. An objective lens system for use in microscopes, constructed as five components and eight lenses of the Gauss type, consisting of a first component of a single positive lens, a second component of a compound positive lens, third and fourth components of compound negative lenses, and a fifth component of a single positive lens, all lenses arranged in succession from the side of the object, further comprising a negative lens system located at the image side and consisting of a single or compound negative meniscus lens, wherein N.A. = 0.4, Magnification = 20 X, $f$ = 9.77, $f_1$ = 17.44 (1.79f), and $r_1$ to $r_{15}$, $d_0$ to $d_{14}$, $n_1$ to $n_9$ and $\nu_1$ to $\nu_9$ are defined by the following values;

|  |  |  |  |  |  |  |
|---|---|---|---|---|---|---|
|  |  | $d_0$ | 4.42 |  |  |  |
| $r_1$ | −8.330 |  |  |  |  |  |
|  |  | $d_1$ | 2.93 | $n_1$ | 1.56384 | $\nu_1$ | 60.81 |
| $r_2$ | −5.107 |  |  |  |  |  |
|  |  | $d_2$ | 0.16 |  |  |  |
| $r_3$ | 26.277 |  |  |  |  |  |
|  |  | $d_3$ | 1.03 | $n_2$ | 1.54869 | $\nu_2$ | 45.55 |
| $r_4$ | 12.170 |  |  |  |  |  |
|  |  | $d_4$ | 2.33 | $n_3$ | 1.48656 | $\nu_3$ | 84.47 |
| $r_5$ | −11.288 |  |  |  |  |  |
|  |  | $d_5$ | 0.37 |  |  |  |
| $r_6$ | 7.851 |  |  |  |  |  |
|  |  | $d_6$ | 3.44 | $n_4$ | 1.61800 | $\nu_4$ | 63.38 |
| $r_7$ | −9.580 |  |  |  |  |  |
|  |  | $d_7$ | 3.05 | $n_5$ | 1.63930 | $\nu_5$ | 44.88 |
| $r_8$ | 4.291 |  |  |  |  |  |
|  |  | $d_8$ | 3.20 |  |  |  |
| $r_9$ | −3.706 |  |  |  |  |  |
|  |  | $d_9$ | 1.00 | $n_6$ | 1.57309 | $\nu_6$ | 42.57 |
| $r_{10}$ | 23.354 |  |  |  |  |  |
|  |  | $d_{10}$ | 4.03 | $n_7$ | 1.48656 | $\nu_7$ | 84.47 |
| $r_{11}$ | −6.104 |  |  |  |  |  |
|  |  | $d_{11}$ | 0.24 |  |  |  |
| $r_{12}$ | 17.008 |  |  |  |  |  |
|  |  | $d_{12}$ | 3.30 | $n_8$ | 1.48656 | $\nu_8$ | 84.47 |
| $r_{13}$ | −18.935 |  |  |  |  |  |
|  |  | $d_{13}$ | 7.00 |  |  |  |
| $r_{14}$ | 10.151 |  |  |  |  |  |
|  |  | $d_{14}$ | 4.27 | $n_9$ | 1.58144 | $\nu_9$ | 40.75 |
| $r_{15}$ | 7.098 |  |  |  |  |  | where $f$ is the focal length of the total lens system;

$f_1$ is the focal length of the first component of the single positive lens;

$r_1, r_8, r_9$ are radii of curvatures of the front concave surface of the first component of the single positive lens, rear and front concave surfaces of the third and fourth components of compound negative lenses, respectively;

$d_1$ is the axial thickness of the first component of the single positive lens;

$\nu_3, \nu_7$ are Abbe's numbers of the positive lenses of the second and fourth components of compound negative lenses, respectively;

$f_p$ is the composite focal length of the positive lens system located at the object side; and $\nu_8$ is the Abbe's number of the fifth component of the single positive lens of said lens system located at the object side.

* * * * *